Figure 1:
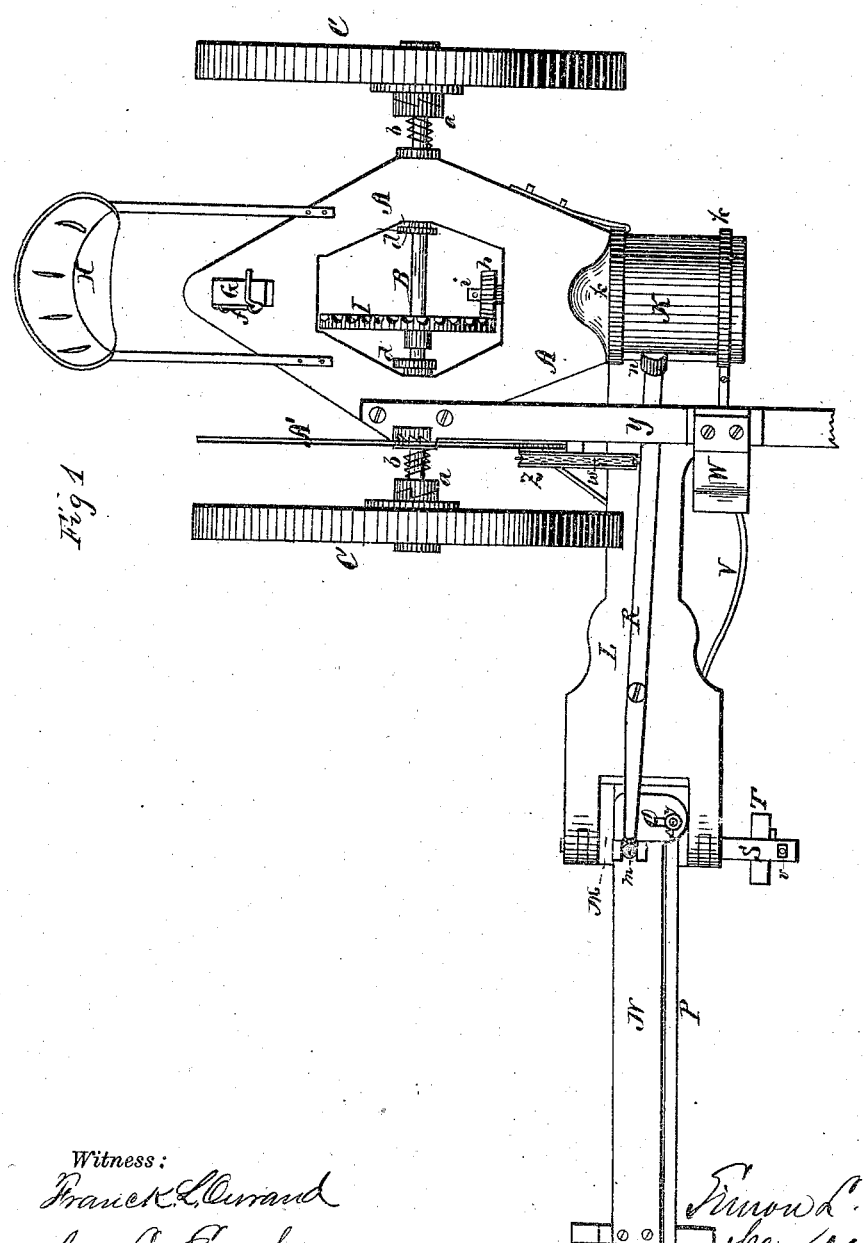

2 Sheets--Sheet 1.

S. L. McCOLLOCH.
Harvesters.

No. 138,172. Patented April 22, 1873.

Witness:
Franck L. Durand
le L. Evert

Inventor.
Simon L. McColloch
per Alexander Mason
Attorneys.

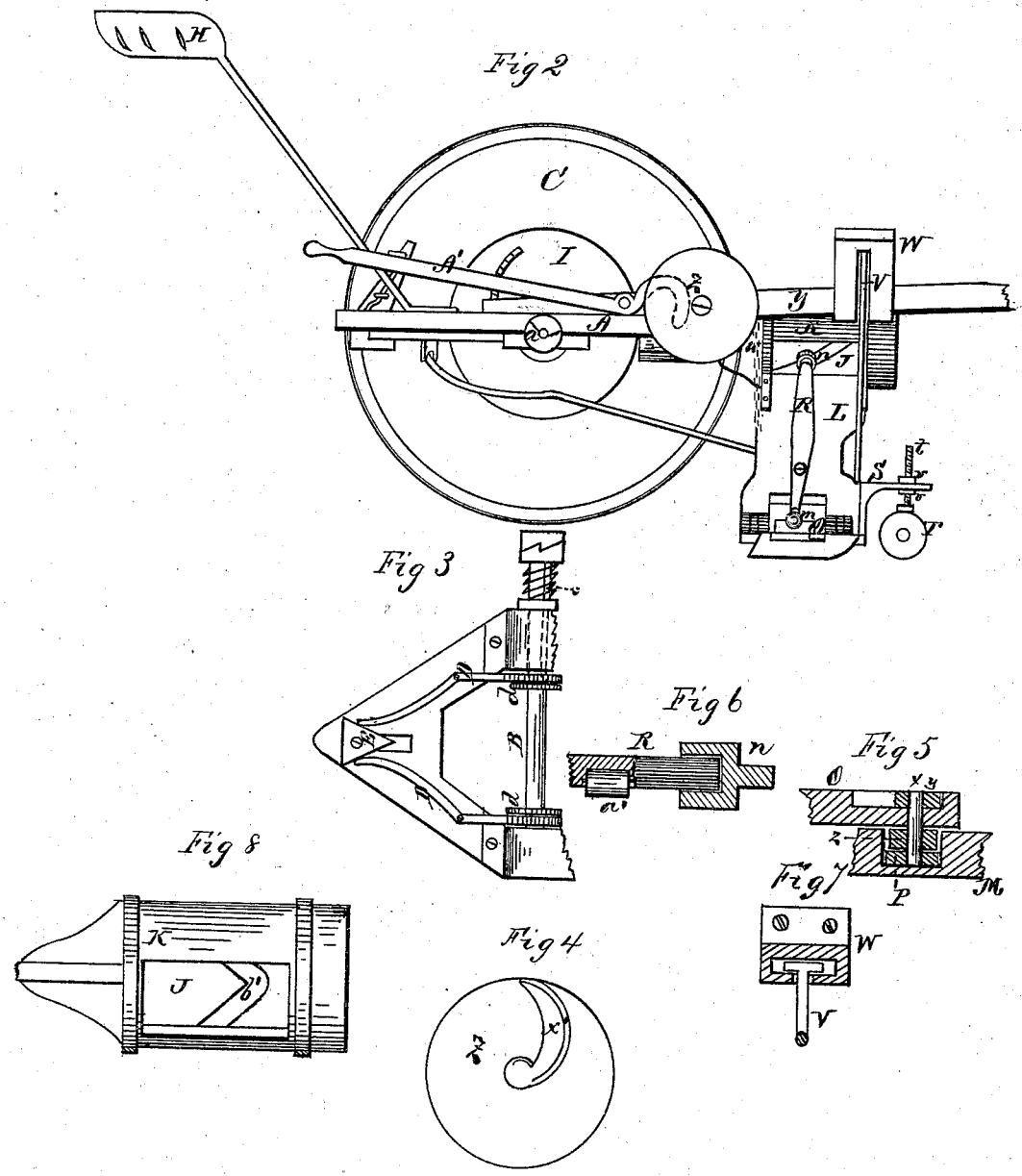

UNITED STATES PATENT OFFICE.

SIMON L. McCOLLOCH, OF WHEELING, WEST VIRGINIA.

IMPROVEMENT IN HARVESTERS.

Specification forming part of Letters Patent No. 138,172, dated April 22, 1873; application filed March 6, 1873.

*To all whom it may concern:*

Be it known that I, SIMON L. MCCOLLOCH, of Wheeling, in the county of Ohio and in the State of West Virginia, have invented certain new and useful Improvements in Harvester; and do hereby declare that the following is a full, clear, and exact description thereof, reference being had to the accompanying drawing and to the letters of reference marked thereon making a part of this specification.

The nature of my invention consists in the construction and arrangement of a mowing-machine, as will be hereinafter more fully set forth.

In order to enable others skilled in the art to which my invention appertains to make and use the same, I will now proceed to describe its construction and operation, referring to the annexed drawing, in which—

Figure 1 is a plan view, and Fig. 2 a side elevation of my machine. Figs. 3 to 8 are detached views of certain parts thereof.

A represents a diamond-shaped platform, having suitable boxes on its under side for the passage or reception of the axle B, upon each end of which is a driving-wheel, C. Upon each end of the axle B on the inner side of the driving-wheel is a clutch, $a$, pressed by a spiral spring, $b$, against the toothed inner end of the hub of the wheel so as to engage with the same. This clutch $a$ is by a rod, $e$, connected with a collar, $d$, placed on the axle in an opening made in the platform, said rod $e$ fitting in a longitudinal groove on the axle.

It will readily be seen that, when the machine moves forward, the clutch $a$ and rod $e$ cause the axle to turn or revolve with the wheels; but, when moving backward, the clutch will move inward on the axle and prevent the same from revolving.

On the under side of the platform A are pivoted two levers, D D, the front ends of which are curved around the collars $d\ d$, or forked to grasp the same. Between the rear ends of the levers D D is placed a triangular or wedge-shaped piece, E, which is attached to the lower end of an inclined standard or foot-piece, G, on top of the platform A, and projecting through a slot in said platform. H represents the driver's seat, supported above and in rear of the rear end of the platform.

The driver from his seat can readily with his foot push forward the standard or foot-piece G, moving the wedge E also forward, and separating thereby the rear ends of the levers D D, which has the effect of drawing inward their front ends with the collars $d\ d$, and said collars being by the rods $e\ e$ connected with the clutches $a\ a$, said clutches are drawn away from the wheels, and thus the machine thrown out of gear. A pin, $f$, attached to the side of the standard G, can then be pushed down into a hole in the platform to hold the machine out of gear. Then, when it is desired to throw the machine in gear again, the pin $f$ is raised and the standard moved backward, when the springs $b\ b$ will throw the clutches $a\ a$ outward in gear with the hubs of the wheels C C.

On the axle B, within the opening in the platform A, is secured a large bevel-gear, I, which gears with a similar pinion, $h$, upon the rear end of a shaft, $i$, and this shaft passes through suitable journal-boxes on the under side of the front end of the platform, and upon the front end of said shaft $i$ is firmly secured a cylinder or roller, J, which is provided with a zigzag groove around its entire circumference. The cylinder or roller J is inclosed within a cylindrical casing, K, firmly attached to the front end of the platform, and open on the right side only. To the casing K is hinged a bar, L, by means of straps $k\ k$ attached to said bar and passing around the casing. At the outer end of the bar L is hinged the shoe M, to which the inner end of the finger-bar N is firmly secured. On the upper side of the shoe M is pivoted an L-shaped or elbow lever, O, to one arm of which the cutter-bar P is attached, and the other arm has a longitudinal groove in its upper surface, as shown in Fig. 1. On the bar L is pivoted a lever, R, the pivot being at such a point that one-third the length of the lever will be below and the other two-thirds above said point. On the lower end of the lever R is pivoted a ball, $m$, which is placed and works in the groove mentioned on the upper side of the arm of the elbow-lever O. On the upper end of the lever R is a friction-roller, $n$, constructed as shown in Fig. 6, it having a solid tenon which fits in the zigzag or serpentine groove on the cylinder or roller J, while the main part of the friction-roller bears against the edge of the opening in the casing K.

By means of the lever R and elbow-lever O the rotary motion of the roller or cylinder J is converted into a reciprocating motion of the cutter-bar P.

In building the full-sized machines it may become necessary to add a countershaft with pinion and cog-wheel to give the cutter-bar the required speed, in which case the gear I should mesh with the pinion on the countershaft, and the wheel on said shaft mesh with the pinion.

The outer end of the casing K may be made separate and form a cap for the casing, and in the center of this cap on the inner side will be formed a box or socket to form a bearing for the front end of the shaft $i$.

The joint between the cutter-bar P and elbow-lever O is made in the following manner: The elbow-lever is slotted, and the pivot $f$ is within said slot provided with a friction-roller, $y$, to move in this slot; and on said pivot below the elbow-lever is another friction-roller, $z$, to work in the groove on the shoe M, where the inner end of the cutter-bar P works. At the front end of the shoe M is an upward-and-forward projecting L-shaped arm, S, through the front end of which passes the shank $t$ of a caster-wheel, T, the said shank being held at any desired height by nuts $v$ $v$, one above and the other below the arm. The caster-wheel T supports the shoe M and the inner end of the cutter-bar above the ground, and by means of the nuts $v$ $v$ the distance of the shoe from the ground may be readily regulated to suit circumstances. It also facilitates the turning of the machine. At the inner edge of the shoe M is attached the lower end of a brace-rod, V, the upper end of which is T-shaped and placed in a grooved casting, W, attached to the tongue Y, said tongue being securely fastened on the right side of the platform A above the axle. The casting W stands in an inclined position on the tongue and is grooved longitudinally on its under side for the reception of the T on the upper end of the brace-rod V. When the cutter-bar is level on the ground this T will stand at about the center of the groove in the casting, and will allow of the cutter-bar accommodating itself to the inequalities of the ground over which it is passing. If the outer end rises up the T of the brace will move downward, and if the inner end rises up it will move upward in the groove on the casting. From the bar L extends a chain, $w$, which is hooked into a circumferential groove on a wheel, Z, mounted on the side of the tongue Y. On the inner side of this wheel is a cam-shaped projection, $x'$, as shown in Fig. 4, to be operated upon by a hook-shaped lever, A', pivoted to the side of the tongue, and its rear end within reach of the driver upon his seat H. By raising the rear end of the lever A' the hook at its front end will operate upon and turn the wheel Z, so as to raise the outer end of the bar L. At the first commencement of this movement of the bar L the T at the upper end of the brace-rod V slides to the upper end of the groove in the casting W, and then while the movement of the bar L is being completed the brace-rod V causes the shoe M to turn and throw the cutter-bar up perpendicularly. Even when in this position it will be seen that the lever R will operate the cutter-bar if the machine is in gear and give it a reciprocating motion. In the under side of the lever R, a suitable distance from the upper end, is a friction-roller, $a'$, inserted to bear on the bar L, as shown in Fig. 6. The grooved cylinder or roller J being arranged at the front end of the platform or frame of the mower allows of the vibrating-lever connecting directly with the inner end of the cutter-bar, as shown, and gives a more rapid motion to the same than could be obtained through the more complicated machinery necessary where the cylinder is placed at any other point on the frame.

The cylinder may be made of any length desired, so as to obtain more or less length of stroke of the knives, and the pivot-point of the lever R must, of course, be changed to suit, according to the desired stroke.

As the knives are allowed to move, even when the cutter-bar is raised perpendicular, it is evident that my machine may also be used a hedge-trimmer; and it is also evident that the cutter-bar may be hung in rear of the machine, in which case the cylinder will be located at the rear instead of the front end of the frame or platform.

The groove $b'$ in the cylinder J is constructed as shown in Fig. 8, its corners having the outer side rounded and the inner side sharp or pointed, whereby the friction-roller $n$ on the end of the vibrating-lever is not only guided smoothly around the corners, but the change of direction is instantaneous, making no dead centers where the motion of the lever is momentarily stopped or arrested.

Having thus fully described my invention, what I claim as new, and desire to secure by Letters Patent, is—

1. The combination, with the clutches $a$ and springs $b$, of the rods $e$, collars $d$, levers D, and foot-piece G with wedge E, all substantially as and for the purposes herein set forth.

2. The cylinder J placed at the end of the main frame, and provided on its circumference with zigzag grooves, as shown, in combination with the vibrating lever R, hinged bar L, elbow-lever O, shoe M, and cutter-bar P, substantially as and for the purposes herein set forth.

3. The combination of the vibrating lever R, ball $m$, and grooved elbow-lever O with the shoe M and cutter-bar P, for the purposes herein set forth.

4. The combination of the slotted elbow-lever O, cutter-bar P, shoe M, pivot $x$, and friction-rollers $y$ $z$, for the purposes herein set forth.

5. In combination with the hinged bar L and shoe M, the curved brace-rod V provided with a T-head, and the casting W secured at an angle to the tongue $y$ and provided with an oblong slot on its under side, within which the T-head moves, substantially as and for the purposes herein set forth.

6. The arrangement of the hooked lever A′, wheel Z with cam $x'$, and chain $w$ connecting with the bar L, for the purposes herein set forth.

In testimony that I claim the foregoing I have hereunto set my hand this 6th day of March, 1873.

SIMON L. McCOLLOCH.

Witnesses:
A. N. MARR,
C. L. EVERT.